United States Patent
Braley et al.

(10) Patent No.: US 12,131,550 B1
(45) Date of Patent: Oct. 29, 2024

(54) METHODS AND APPARATUS FOR VALIDATING SENSOR DATA

(71) Applicant: Waymo LLC, Mountain View, CA (US)

(72) Inventors: Colin Braley, Mountain View, CA (US); Volodymyr Ivanchenko, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 181 days.

(21) Appl. No.: 17/138,125

(22) Filed: Dec. 30, 2020

Related U.S. Application Data

(60) Provisional application No. 62/955,257, filed on Dec. 30, 2019.

(51) Int. Cl.
| | |
|---|---|
| *G06V 20/58* | (2022.01) |
| *B60W 60/00* | (2020.01) |
| *G06F 18/213* | (2023.01) |
| *G06V 10/75* | (2022.01) |

(52) U.S. Cl.
CPC .......... *G06V 20/58* (2022.01); *B60W 60/001* (2020.02); *G06F 18/213* (2023.01); *G06V 10/751* (2022.01); *B60W 2420/403* (2013.01); *B60W 2420/408* (2024.01); *B60W 2554/20* (2020.02)

(58) Field of Classification Search
None
See application file for complete search history.

(56) References Cited

U.S. PATENT DOCUMENTS

| | | | |
|---|---|---|---|
| 7,925,049 B2 | 4/2011 | Zhu et al. | |
| 8,213,706 B2 | 7/2012 | Krishnaswamy et al. | |
| 9,058,521 B2 | 6/2015 | Yoon et al. | |
| 9,315,192 B1* | 4/2016 | Zhu | G06K 9/6217 |
| 9,449,397 B2 | 9/2016 | Chang et al. | |
| 9,811,760 B2 | 11/2017 | Richardson et al. | |
| 9,946,264 B2 | 4/2018 | Liao et al. | |

(Continued)

FOREIGN PATENT DOCUMENTS

WO    2019160778 A1    8/2019

OTHER PUBLICATIONS

Automatic Targetless Extrinsic Calibration of a 3D Lidar and Camera by Maximizing Mutual Information. Pandey et al. (Year: 2012).*

(Continued)

*Primary Examiner* — Delomia L Gilliard
(74) *Attorney, Agent, or Firm* — McDonnell Boehnen Hulbert & Berghoff LLP

(57) ABSTRACT

In one example, a method is provided that includes receiving lidar data obtained by a lidar device. The lidar data includes a plurality of data points indicative of locations of reflections from an environment of the vehicle. The method includes receiving images of portions of the environment captured by a camera at different times. The method also includes determining locations in the images that correspond to a data point of the plurality of data points. Additionally, the method includes determining feature descriptors for the locations of (Continued)

the images and comparing the feature descriptors to determine that sensor data associated with at least one of the lidar device, the camera, or a pose sensor is accurate or inaccurate.

20 Claims, 7 Drawing Sheets

(56) References Cited

U.S. PATENT DOCUMENTS

| | | |
|---|---|---|
| 9,987,898 B2 | 6/2018 | Deigmoller et al. |
| 10,013,765 B2 | 7/2018 | Ramalingam et al. |
| 10,127,461 B2 | 11/2018 | Viswanathan |
| 10,309,777 B2 | 6/2019 | Zhang et al. |
| 10,339,411 B1* | 7/2019 | Hua .................. G06T 17/20 |
| 2019/0011927 A1 | 1/2019 | Mou |
| 2019/0050997 A1 | 2/2019 | Scholl et al. |
| 2019/0147341 A1* | 5/2019 | Rabinovich ............... G06T 7/97 382/156 |
| 2019/0180467 A1 | 6/2019 | Li et al. |
| 2019/0271548 A1* | 9/2019 | Colgate .............. G01C 21/3848 |
| 2019/0301886 A1* | 10/2019 | Elangovan ............ G06T 19/006 |
| 2020/0018852 A1* | 1/2020 | Walls .................... G01S 7/4972 |
| 2020/0160479 A1* | 5/2020 | Horesh ..................... G06T 7/74 |
| 2020/0226776 A1* | 7/2020 | Toma ...................... G06T 7/593 |
| 2020/0334857 A1* | 10/2020 | Garud ....................... G06T 7/75 |
| 2021/0104156 A1* | 4/2021 | Trummer ................ G06V 20/54 |
| 2022/0148302 A1* | 5/2022 | Bao ....................... G06V 10/752 |

OTHER PUBLICATIONS

ORB: an efficient alternative to SIFT or SURF . Rublee et al. (Year: 2011).*
BRIEF: Binary Robust Independent Elementary Features. Calonder et al. (Year: 2010).*
An Embedded Multi-Modal System for Object Localization and Tracking. Rodriguez et al. (Year: 2010).*
Duraisamy, "3D Reconstruction Using Lidar and Visual Images", Dec. 2012.
Duraisamy, "3D Reconstruction Using Lidar and Visual Images", https://pdfs.semanticscholar.org/1a36/734aa8e54b4107cdc433d982e8da1eb15bb2.pdf, Dec. 2012.
Pandey et al., "Automatic Targetless Extrinsic Calibration of a 3D Lidar and Camera by Maximizing Mutual Information," Proceedings of the Twenty-Sixth AAAI Conference on Artificial Intelligence, Jul. 2021.
Calonder et al., "BRIEF: Binary Robust Independent Elementary Features," Computer Vision—ECCV 2010, 11th European Conference on Computer Vision, Heraklion, Crete, Greece, Sep. 5-11, 2010, Proceedings, Part IV.
Rublee et al., "ORB: an efficient alternative to SIFT or SURF," IEEE International Conference on Computer Vision, ICCV 2011, Barcelona, Spain, Nov. 6-13, 2011.

* cited by examiner

METHODS AND APPARATUS FOR VALIDATING SENSOR DATA

CROSS-REFERENCE TO RELATED APPLICATIONS

The present application claims priority to and is a non-provisional filing of U.S. Provisional Patent Application Ser. No. 62/955,257 filed on Dec. 30, 2019, the entire contents of which is herein incorporated by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles typically include one or more sensors that are configured to detect information about the environment in which the vehicle operates. The vehicles may be configured to use the detected information to navigate through the environment. For example, if the sensor(s) detect that the vehicle is approaching an obstacle, the vehicle may use the sensor data to adjust the vehicle's directional controls to cause the vehicle to navigate around the obstacle.

In order to determine that the sensors are accurately detecting objects in the environment, the sensors may undergo verification to ensure proper calibration. For example, the sensors of the vehicle may undergo testing and verification to maintain proper performance and adherence to specifications. However, conventional sensor verification processes can be labor intensive and costly. For instance, a conventional sensor verification process may involve skilled technicians operating a sensor system to observe specially curated and placed calibration targets in a controlled calibration environment. As a result, conventional verification processes may be associated with high costs, such as costs for setup and maintenance of a suitable testing environment. Further, sensor inaccuracies can develop at any time, and conventional verification processes may not be able to detect such inaccuracies in a timely manner.

SUMMARY

The present application discloses embodiments that relate to methods and apparatus for detecting and validating sensor information. The methods and apparatus may be configured to implement processes to continuously monitor and verify that sensors, such as lidar devices and cameras, of a vehicle are operating properly. For example, a computer device of a vehicle may be configured to validate that the geometric calibrations of a camera are accurate, the relative camera pose is correct, and lidar data is geometrically accurate (e.g., correspondingly camera extrinsics are accurate, pointing in the correct direction, no geometric artifacts, etc.) while the vehicle is operating.

In one aspect, a computing device is provided. The computing device comprises a memory and at least one processor coupled to the memory. The at least one processor is configured to receive lidar data obtained by a lidar device. The lidar data includes a plurality of data points indicative of locations of reflections from an environment of the vehicle. The at least one processor is configured to receive a first image of a first portion of the environment captured by a camera at a first time and to receive a second image of a second portion of the environment captured by the camera at a second time. The at least one processor is also configured to determine a first location in the first image that corresponds to a data point of the plurality of data points and to determine a second location in the second image that corresponds to the data point of the plurality of data points. In one embodiment, the at least one processor is configured to determine a first feature descriptor for the first location of the first image and to determine a second feature descriptor for the second location of the second image. The at least one processor is also configured to perform a comparison of the first feature descriptor to the second feature descriptor and to determine that sensor data associated with at least one of the lidar device, the camera, or a pose sensor is accurate or inaccurate based on the comparison.

In another aspect, a method is provided that includes receiving lidar data obtained by a lidar device. The lidar data includes a plurality of data points indicative of locations of reflections from an environment of the vehicle. The method includes receiving a first image of a first portion of the environment captured by a camera at a first time and receiving a second image of a second portion of the environment captured by the camera at a second time. The method includes determining a first location in the first image that corresponds to a data point of the plurality of data points and determining a second location in the second image that corresponds to the data point of the plurality of data points. In one embodiment, the method includes determining a first feature descriptor for the first location in the first image and determining a second feature descriptor for the second location of the second image. The method also includes performing a comparison of the first feature descriptor to the second feature descriptor and determining that sensor data associated with at least one of the lidar device, the camera, or a pose sensor is accurate or inaccurate based on the comparison.

In yet another example, a non-transitory computer readable medium storing instructions that cause the computing device to perform functions is provided. The functions include receiving lidar data obtained by a lidar device. The lidar data includes a plurality of data points indicative of locations of reflections from an environment of the vehicle. The functions include receiving a first image of a first portion of the environment captured by a camera at a first time and receiving a second image of a second portion of the environment captured by the camera at a second time. The functions also include determining a first location in the first image that corresponds to a data point of the plurality of data points and determining a second location in the second image that corresponds to the data point of the plurality of data points. In one embodiment, the functions include determining a first feature descriptor for the first location in the first image and determining a second feature descriptor for the second location of the second image. The functions also include performing a comparison of the first feature descriptor to the second feature descriptor and determining that sensor data associated with at least one of the lidar device, the camera, or a pose sensor is accurate or inaccurate based on the comparison.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
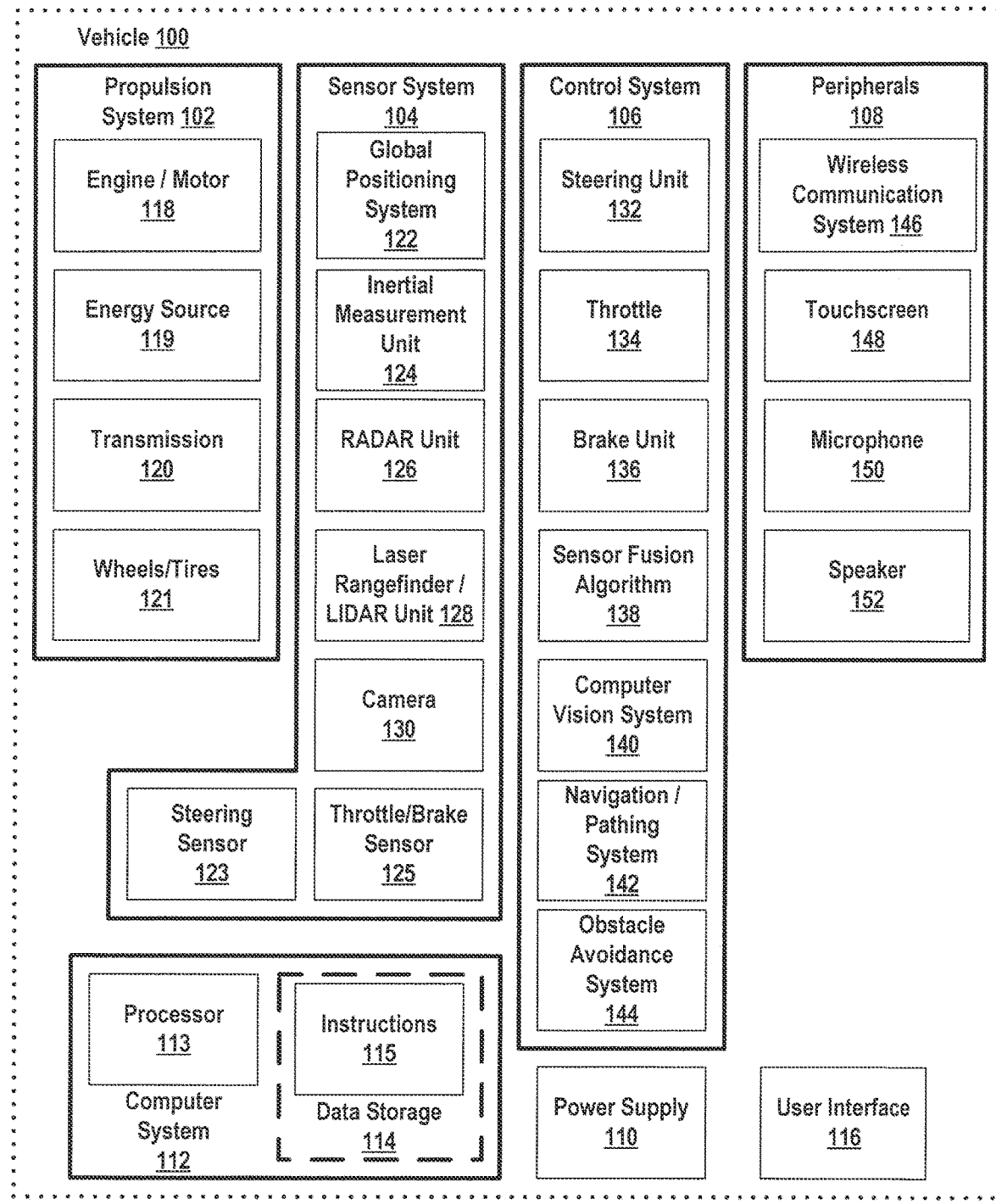
FIG. 1 is a functional block diagram depicting aspects of an example autonomous vehicle.
Figure 2A:
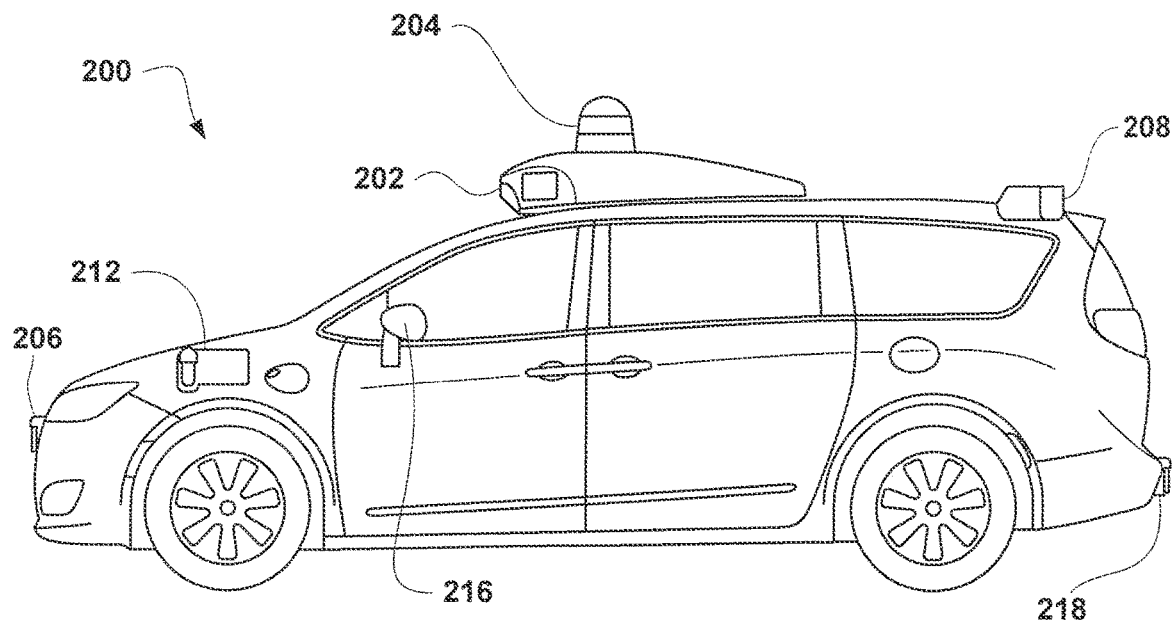
FIG. 2A is an illustration of a physical configuration of a vehicle, according to example embodiments.
Figure 2B:
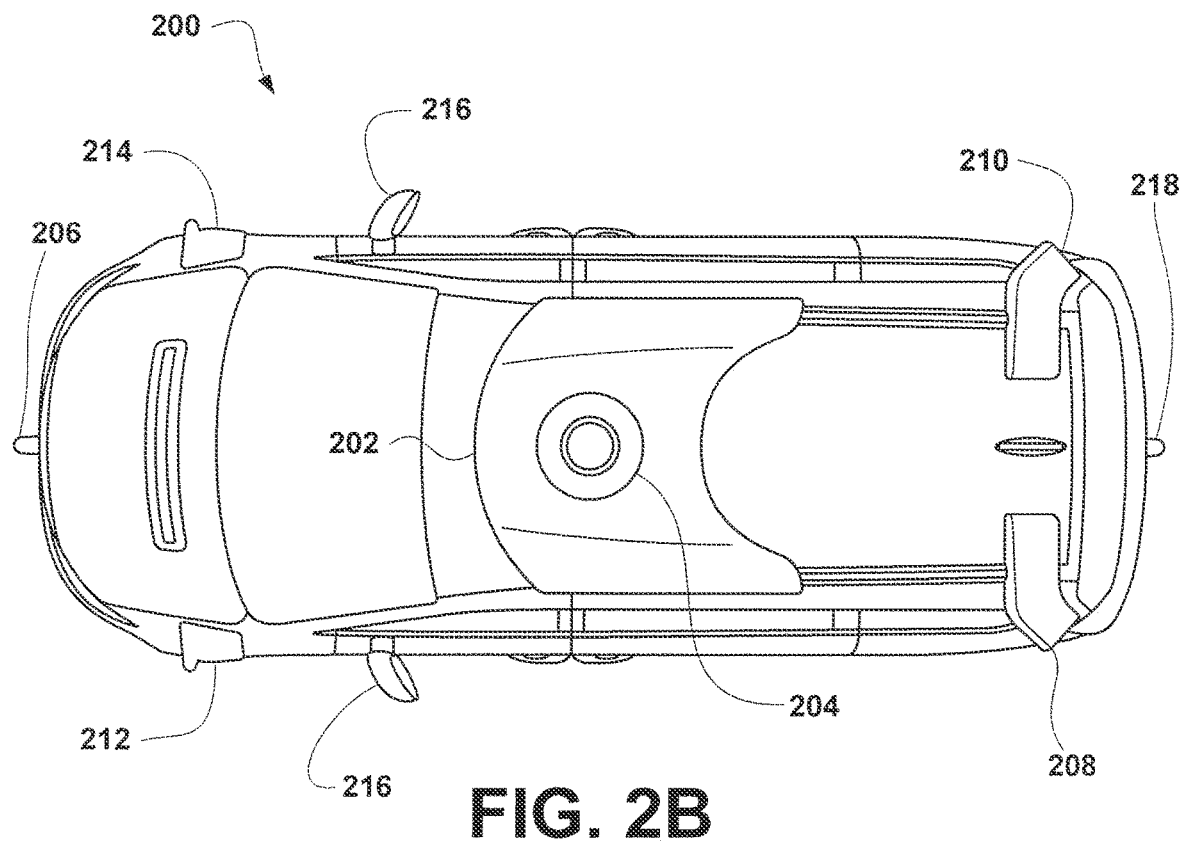
FIG. 2B is an illustration of a physical configuration of a vehicle, according to example embodiments.
Figure 2C:
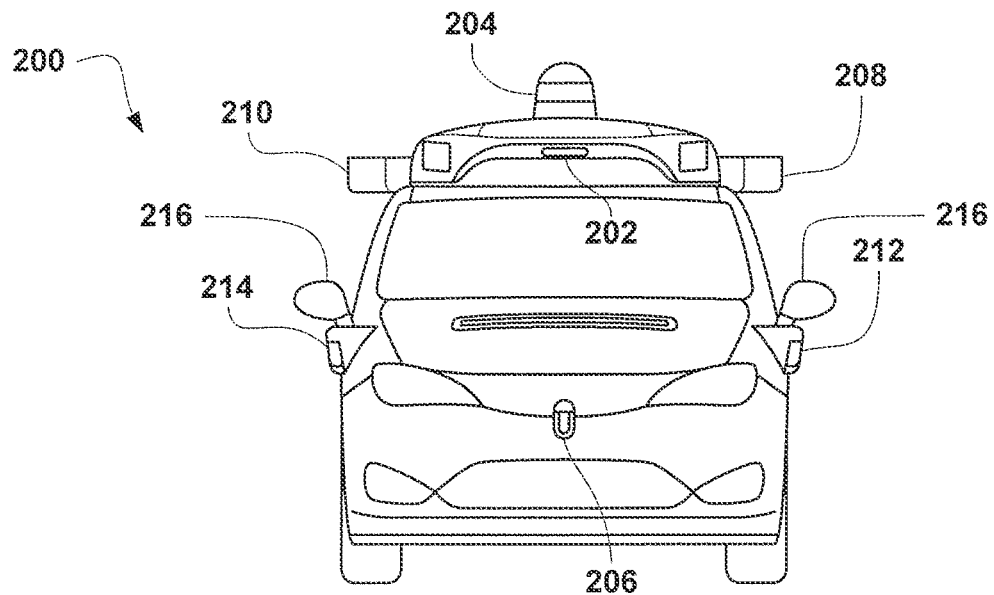
FIG. 2C is an illustration of a physical configuration of a vehicle, according to example embodiments.
Figure 2D:
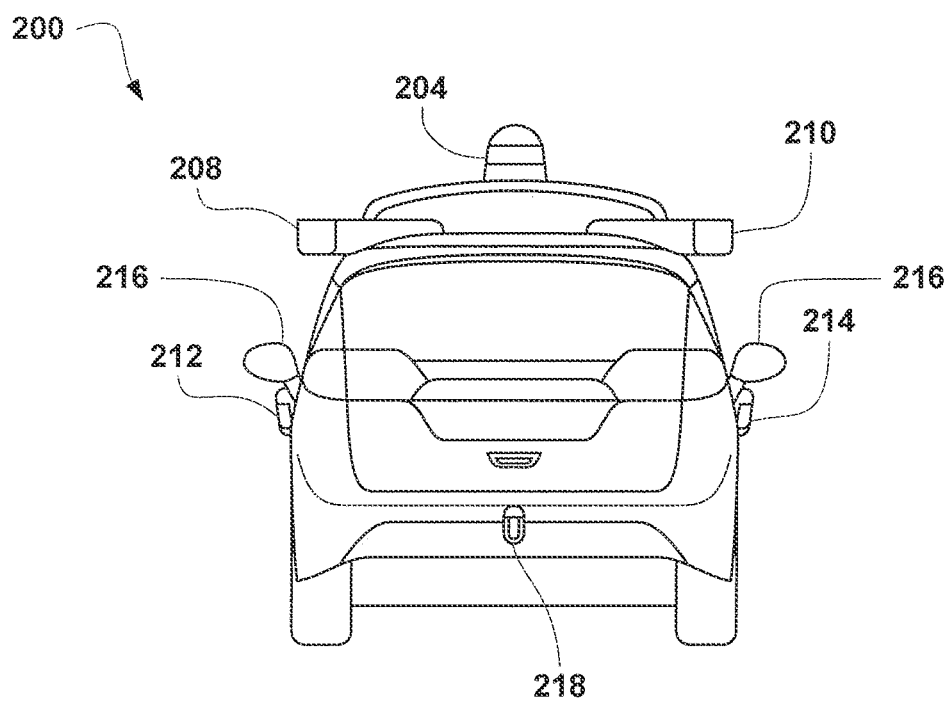
FIG. 2D is an illustration of a physical configuration of a vehicle, according to example embodiments.
Figure 2E:
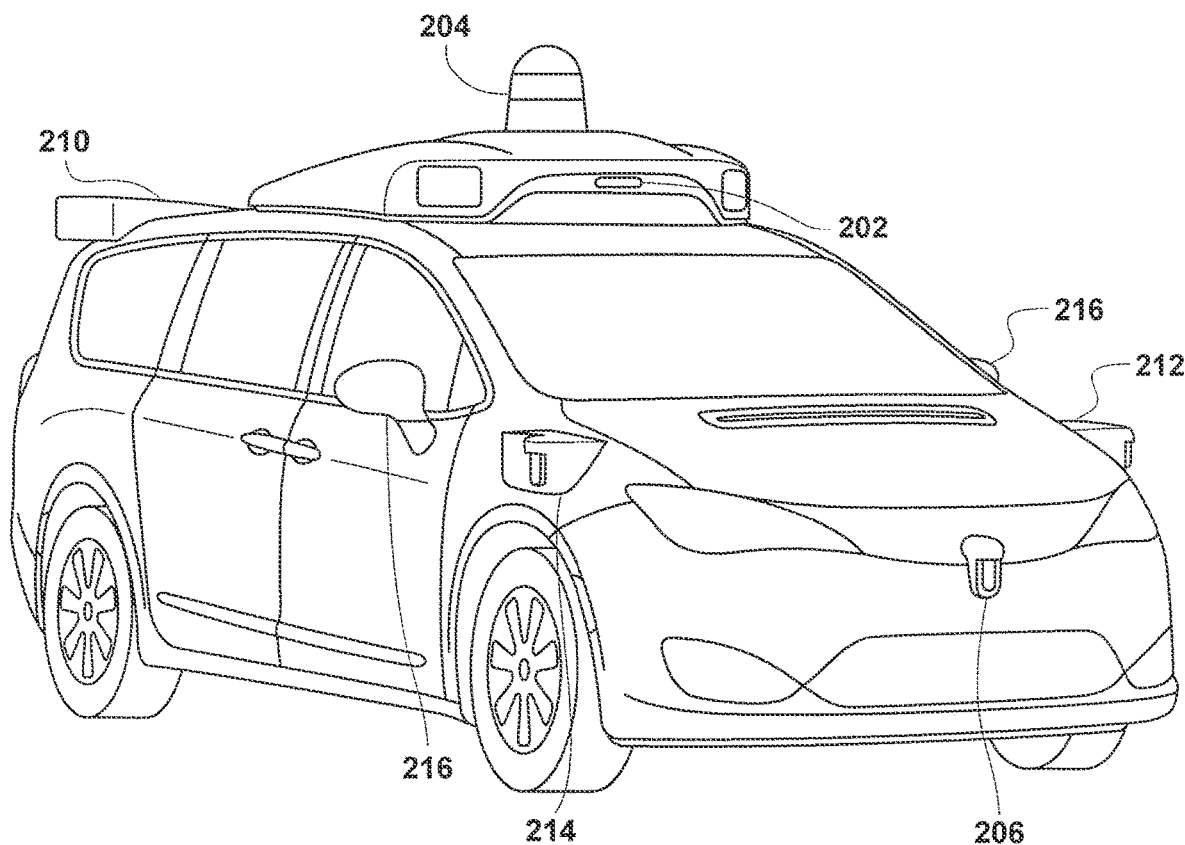
FIG. 2E is an illustration of a physical configuration of a vehicle, according to example embodiments.

The following detailed description describes various features and functions of the disclosed apparatus and methods with reference to the accompanying figures. In the figures, similar symbols identify similar components, unless context dictates otherwise. The illustrative embodiments described herein are not meant to be limiting. It may be readily understood by those skilled in the art that certain aspects of the disclosed apparatus and methods can be arranged and combined in a wide variety of different configurations, all of which are contemplated herein.

Methods and apparatus are disclosed to validate sensor data. An autonomous vehicle may navigate a path of travel without user intervention and may receive assistance from different sensors associated with the vehicle to avoid requiring user input. For example, an autonomous vehicle may be configured to utilize radio detection and ranging (radar) sensors, light detection and ranging (lidar) sensors, GPS sensors, cameras, and computer vision sensors to detect obstacles and/or other vehicles in the surrounding environment to facilitate navigation. The sensors may be linked to the autonomous vehicle via a network connection or may be directly connected to a component of the vehicle. In addition, an autonomous vehicle may use different types of control systems and/or software functions to navigate properly including avoiding possible obstacles and identifying relevant objects.

For example, an autonomous vehicle may include a computing device configured to receive data (e.g., point cloud data) corresponding to an environment captured by a lidar device. The computing device may be configured to receive camera images of the environment captured by a camera at different times and poses. The computing device may also be configured to select one or more lidar points of the point cloud data whose three-dimensional (3D) points correspond to points or locations in the camera images. For example, the lidar points may be selected from parts of the point cloud data that correspond to static objects in the environment. For each lidar point, the computing device may be configured to determine a corresponding location (e.g., pixel) in each of the camera images by back-projecting the lidar point's location into the camera images.

After the corresponding locations are determined in the camera images, the computing device may be configured to compare the feature descriptors (e.g., keypoint descriptors) corresponding to the locations of the images. Based on the comparison, the computing device may determine that the camera is miscalibrated, the lidar point cloud is geometrically inaccurate, and/or the camera pose is inaccurate.

In one embodiment, a computing unit is provided. The computing unit comprises a memory and at least one processor coupled to the memory. The at least one processor is configured to receive lidar data obtained by a lidar device. The lidar data includes a plurality of data points indicative of locations of reflections from an environment of the vehicle. The at least one processor is configured to receive a first image of a first portion of the environment captured by a camera at a first time and to receive a second image of a second portion of the environment captured by the camera at a second time. The at least one processor is also configured to determine a first location in the first image that corresponds to a data point of the plurality of data points and to determine a second location in the second image that corresponds to the data point of the plurality of data points. In one embodiment, the at least one processor is also configured to determine a first feature descriptor for the first location of the first image and to determine a second feature descriptor for the second location of the second image. The at least one processor is also configured to perform a comparison of the first feature descriptor to the second feature descriptor and to determine that sensor data associated with at least one of the lidar device, the camera, or a pose sensor is accurate or inaccurate based on the comparison.

In another embodiment, a method is provided that includes receiving data obtained by a lidar device. The lidar data includes a plurality of data points indicative of locations of reflections from an environment of the vehicle. The method includes receiving a first image of a first portion of the environment captured by a camera at a first time and receiving a second image of a second portion of the environment captured by the camera at a second time. The method also includes determining a first location in the first image that corresponds to a data point of the plurality of data points and determining a second location in the second image that corresponds to the data point of the plurality of data points. In one embodiment, the method includes determining a first feature descriptor for the first location of the first image and determining a second feature descriptor for the second location of the second image. The method also includes performing a comparison of the first feature descriptor to the second feature descriptor and determining that sensor data associated with at least one of the lidar device, the camera, or a pose sensor is accurate or inaccurate based on the comparison.

In yet another embodiment, a non-transitory computer readable medium storing instructions that cause the computing device to perform functions is provided. The functions include receiving lidar data obtained by a lidar device. The lidar data includes a plurality of data points indicative of locations of reflections from an environment of the vehicle. The functions include receiving a first image of a first portion of the environment captured by a camera at a first time and receiving a second image of a second portion of the environment captured by the camera at a second time. The functions include determining a first location in the first image that corresponds to a data point of the plurality of data points and determining a second location in the second image that corresponds to the data point of the plurality of data points. In one embodiment, the functions include determining a first feature descriptor for the first location of the first image and determining a second feature descriptor for the second location of the second image. The functions also include performing a comparison of the first feature descriptor to the second feature descriptor and determining that sensor data associated with at least one of the lidar device, the camera, or a pose sensor is accurate or inaccurate based on the comparison.

Example methods and apparatus within the scope of the present disclosure will now be described in greater detail. Generally, example apparatus may be implemented in or may take the form of a component of an automobile. However, example apparatus may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well, and, in some embodiments, example systems might not include a vehicle.

Furthermore, although example apparatus are shown and described as components of vehicles that may be configured to operate in autonomous mode, the embodiments described herein are also applicable for use with vehicles that are not configured to operate autonomously. Thus, the example vehicles are not meant to limit the present disclosure to autonomous vehicles.

Referring now to the figures, FIG. 1 is a functional block diagram illustrating example vehicle 100, which may be configured to operate fully or partially in an autonomous mode. More specifically, the vehicle 100 may operate in an autonomous mode without human interaction through receiving control instructions from a computer system or computing device. As part of operating in the autonomous mode, the vehicle 100 may use sensors to detect and identify objects of the surrounding environment to enable safe navigation. For example, a computer system or device 112 can control the vehicle 100 while in an autonomous mode via sending control instructions to a control system 106 of the vehicle 100. The computer system 112 can receive information from one or more sensor systems 104, and base one or more control processes (such as setting a heading so as to avoid a detected obstacle) upon the received information in an automated fashion. In some embodiments, vehicle 100 may also include subsystems that enable a driver to control operations of vehicle 100.

As shown in FIG. 1, the vehicle 100 may include various subsystems, such as a propulsion system 102, a sensor system 104, a control system 106, one or more peripherals 108, a power supply 110, a computer system/computing device or unit 112, and a user interface 116. In other examples, the vehicle 100 may include more or fewer subsystems and each subsystem can optionally include multiple components. The subsystems and components of vehicle 100 may be interconnected and/or in communication. In addition, the functions of the vehicle 100 described herein can be divided between additional functional or physical components, or combined into fewer functional or physical components. For instance, the control system 106 and the computer system 112 may be combined into a single system that operates the vehicle 100 in accordance with various operations.

The propulsion system 102 of the vehicle 100 can include one or more components operable to provide powered motion to the vehicle 100. In some embodiments, the propulsion system 102 can include an engine/motor 118, an energy source 119, a transmission 120, and wheels/tires 121. The engine/motor 118 may be configured to convert an output of the energy source 119 to mechanical energy. The engine/motor 118 may be or include any combination of an internal combustion engine, an electric motor, a steam engine, and a Stirling engine, among other possible options. For instance, in some embodiments, propulsion system 102 may include multiple types of engines and/or motors, such as a gasoline engine and an electric motor.

The energy source 119 of the propulsion system 102 represents a source of energy that may, in full or in part, power one or more systems of vehicle 100 (e.g., engine/motor 118). For instance, the energy source 119 can correspond to gasoline, diesel, other petroleum-based fuels, propane, other compressed gas-based fuels, ethanol, solar panels, batteries, and/or other sources of electrical power. In some embodiments, the energy source 119 may include a combination of fuel tanks, batteries, capacitors, and/or flywheels. The energy source 119 may also provide energy for other systems of the vehicle 100.

The transmission 120 of the propulsion system 102 may be configured to convey or transmit mechanical power from the engine/motor 118 to the wheels/tires 121 or other systems of the vehicle 100. In some embodiments, the transmission 120 includes a gearbox, a clutch, a differential, a drive shaft, and/or axle(s), or other suitable components. In examples where the transmission 120 includes drive shafts, the drive shafts could include one or more axles that are configured to be coupled to the wheels/tires 121.

The wheels/tires 121 of the propulsion system 102 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. The wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 of the vehicle 100 may include one or more sensors configured to detect or sense information about the environment surrounding the vehicle 100. For example, the sensor system 104 can include a Global Positioning System (GPS) 122, a steering sensor 123, an inertial measurement unit (IMU) 124, a throttle/brake sensor 125, a radar unit 126, a laser rangefinder/lidar unit 128, and/or a camera 130. In some embodiments, the sensor system 104 could also include sensors configured to monitor internal systems of the vehicle 100 (e.g., 02 monitor, fuel gauge, engine oil temperature, wheel speed sensors, brake wear, etc.). One or more of the sensors included in sensor system 104 could be configured to be actuated separately and/or collectively in order to modify a position and/or an orientation of the one or more sensors.

The GPS 122 of the sensor system 104 is a sensor configured to estimate a geographic location of the vehicle 100. To this end, the GPS 122 can include a transceiver operable to provide information regarding the position of the vehicle 100 with respect to the Earth, based on satellite-based positioning data. In an example, the computer system or device 112 may be configured to use the GPS module 126 in combination with the map data to estimate a location of a lane boundary on a road on which the vehicle 100 may be travelling on. The GPS 122 may take other forms as well.

The steering sensor 123 of the sensor system 104 may sense a steering angle of vehicle 100, which may involve measuring an angle of the steering wheel or measuring an electrical signal representative of the angle of the steering wheel. In some embodiments, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of vehicle 100.

The IMU 124 of the sensor system 104 may be configured to sense position and orientation changes of the vehicle 100. For example, the IMU 124 may include one or more accelerometers and gyroscopes and may sense the position and orientation changes of the vehicle 100 based on inertial acceleration. For example, the IMU 124 may detect a pitch and yaw of the vehicle 100 while the vehicle 100 is stationary or in motion.

The throttle/brake sensor 125 of the sensor system 104 may detect the position of either the throttle position or brake position of vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of the vehicle 100. In other embodiments, the throttle/brake sensor 125 may be configured to measure a pressure applied to a pedal of the vehicle, such as a throttle or brake pedal.

The radar unit 126 of the sensor system 104 may represent one or more systems configured to use radio signals or waves to sense or determine characteristics of the object such as range, altitude, direction, or speed of the object. The radar unit 130 may be configured to transmit pulses of radio waves or microwaves that may bounce off any object in a path of the waves. The object may return a part of the energy of the waves to a receiver (e.g., dish or antenna), which may be part of the radar unit 130 as well. For example the radar unit 130 may include antennas configured to transmit and receive radio signals. The radar unit 130 also may be configured to perform digital signal processing of received signals (bouncing off the object) and may be configured to identify the object.

The laser rangefinder or lidar unit 128 of the sensor system 104 can be any sensor configured to sense or detect objects in the environment in which the vehicle 100 is located using lasers. The lidar unit 128 is an optical remote sensing technology that can measure distance to, or other properties of, a target by illuminating the target with light. The lidar unit 128 may include components such as light (e.g., laser) source, scanner and optics, photo-detector and receiver electronics, and position and navigation system. As an example, the lidar unit 128 may include a laser source and/or laser scanner configured to emit laser pulses and a detector configured to receive reflections of the laser pulses. For example, the lidar unit 128 may include a laser range finder reflected by a rotating mirror, and the laser is scanned around a scene being digitized, in one or two dimensions, gathering distance measurements at specified angle intervals. In examples, the laser rangefinder/lidar unit 128 can be configured to operate in a coherent (e.g., using heterodyne detection) or an incoherent detection mode.

The lidar unit 132 may be configured to use ultraviolet (UV), visible, or infrared light to image objects and can be used with a wide range of targets, including non-metallic objects. In one example, a narrow laser beam can be used to map physical features of an object with high resolution.

The camera 130 of the sensor system 104 can include one or more devices configured to capture a plurality of images of the environment surrounding the vehicle 100. The camera 130 can be a still camera or a video camera. To this end, the camera may be configured to detect visible light, or may be configured to detect light from other portions of the spectrum, such as infrared or ultraviolet light. Other types of cameras are possible as well. The camera 130 may be a two-dimensional detector, or may have a three-dimensional spatial range. In some examples, the camera 130 may be, for example, a range detector configured to generate a range image indicating a distance from the camera 130 to a number of points in the environment. To this end, the camera 130 may use one or more range detecting techniques. For example, the camera 130 may be configured to use a structured light technique in which the vehicle 100 illuminates an object in the environment with a predetermined light pattern, such as a grid or checkerboard pattern and uses the camera 130 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

In some embodiments, the camera 130 can be mechanically movable such as by rotating and/or tilting a platform to which the camera is mounted. As such, a control process of vehicle 100 may be implemented to control the movement of camera 130.

The control system 106 of the vehicle 100 is configured to control operation(s) to assist in the navigation of the vehicle 100. In one embodiment, the control system 106 includes a steering unit 132, a throttle 134, a brake unit 136, a sensor fusion algorithm 138, a computer vision system 140, a navigation/pathing system 142, and/or an obstacle avoidance system 144.

The steering unit 132 of the control system 106 may be operable to adjust the heading of the vehicle 100. For example, the steering unit 132 can adjust the axis (or axes) of one or more of the wheels/tires 121 so as to effect turning of the vehicle. The throttle 134 of the control system 106 may be configured to control, for instance, the operating speed of the engine/motor 118 and, in turn, adjust forward acceleration of the vehicle 100 via the transmission 120 and the wheels/tires 121. The brake unit 136 of the control system 106 may be configured to decelerate the vehicle 100. For example, the brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 of the control system 106 provides assessments regarding the environment surrounding the vehicle 100 based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations. The sensor fusion algorithm 138 may include an algorithm (or a computer program product storing an algorithm) configured to accept the data from the sensor system 104 as an input. The sensor fusion algorithm 138 can include, for example, a Kalman filter, Bayesian network, or other suitable algorithm. The data may include, for example, data representing information sensed at the sensors of the sensor system 104.

The computer vision system 140 of the control system 106 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 of the control system 106 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 of the control system 106 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent to the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The peripherals 108 of the vehicle may be configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152. The peripherals 108 may provide controls or other elements for a user to interact with the user interface 116. For example, the touchscreen 148 may provide information to users of vehicle 100. The user interface 116 may also accept input from the user via touchscreen 148. The peripherals 108 may also enable vehicle 100 to communicate with devices, such as other vehicle devices.

The wireless communication system 146 is configured to enable communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network.

The wireless communication system 146 may be configured to communicate according to one or more types of wireless communication (e.g., protocols), such as Bluetooth, communication protocols described in IEEE 802.11 (including any IEEE 802.11 revisions), cellular technology (e.g., Code-Division Multiple Access (CDMA), Evolution-Data Optimized (EV-DO), Global System for Mobile communications (GSM)/General Packet Radio Surface (GPRS), 4G cellular communication, such as Worldwide Interoperability for Microwave Access (WiMAX) or Long-Term Evolution (LTE), and/or 5th generation "5G" cellular), Zigbee, dedicated short range communications (DSRC), and radio frequency identification (RFID) communications, among other possibilities, or one or more types of wired communication such as Local Area Network (LAN), etc). Additionally or alternatively, wireless communication system 146 can communicate with a wireless local area network (WLAN), for example, using WiFi. For example, the wireless communication system 146 could communicate directly with a device, for example, using an infrared link, Bluetooth®, and/or ZigBee®. The wireless communication system 146 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The touchscreen 148 is configured to receive inputs from a user of the vehicle 100. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface.

The microphone 150 may be configured to receive audio (e.g., a voice command or other audio input) from a user of the vehicle 100. For example, the microphone 150 can be configured to receive audio (e.g., a voice command or other audio input) from a user of the vehicle 100. In some cases, multiple microphones can be arranged as a microphone array, or possibly as multiple microphone arrays. Similarly, the speakers 152 can be configured to output audio to the user of the vehicle 100.

The power supply 110 of the vehicle 100 can provide power to the components of the vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and the energy source 119 can be implemented together, as in some all-electric cars.

As shown in FIG. 1, many or all of the functions of vehicle 100 can be controlled via the computer system 112 that receives inputs from the sensor system 104, peripherals 108, etc., and communicates appropriate control signals to the propulsion system 102, control system 106, peripherals 108, etc. to effect automatic operation of the vehicle 100 based on its surroundings. The computer system 112 may also represent a plurality of computing devices that serve to control individual components or subsystems of the vehicle 100 in a distributed fashion. For example, the computer system 112 includes at least one processor 113 (which can include at least one microprocessor) that executes instructions 115 stored in a non-transitory computer readable medium, such as the data storage 114.

The processor 113 of the computer system 112 may comprise one or more general-purpose processors and/or one or more special-purpose processors (e.g., image processor, digital signal processor, etc.). To the extent that the processor 113 includes more than one processor, such processors could work separately or in combination. For example, the computer device or computing device 112 may be configured to control functions of the vehicle 100 based on input received through the user interface 116.

The data storage 114 of the computer system 112 may comprise one or more volatile and/or one or more non-volatile storage components, such as optical, magnetic, and/or organic storage, and the data storage 114 may be integrated in whole or in part with the at least one processor 113. In some embodiments, the data storage 114 contains instructions 115 (e.g., program logic) executable by the processor 113 to execute various functions of vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The user interface 116 may be configured to provide information to or receiving input from a user of vehicle 100. The user interface 116 may control or enable control of content and/or the layout of interactive images that could be displayed on the touchscreen 148. Further, the user interface 116 could include one or more input/output devices within a set of the peripherals 108, such as wireless communication system 146, touchscreen 148, microphone 150, and speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216 and 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208 and 210 and/or the first and second lidar units 204 and 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216 and 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
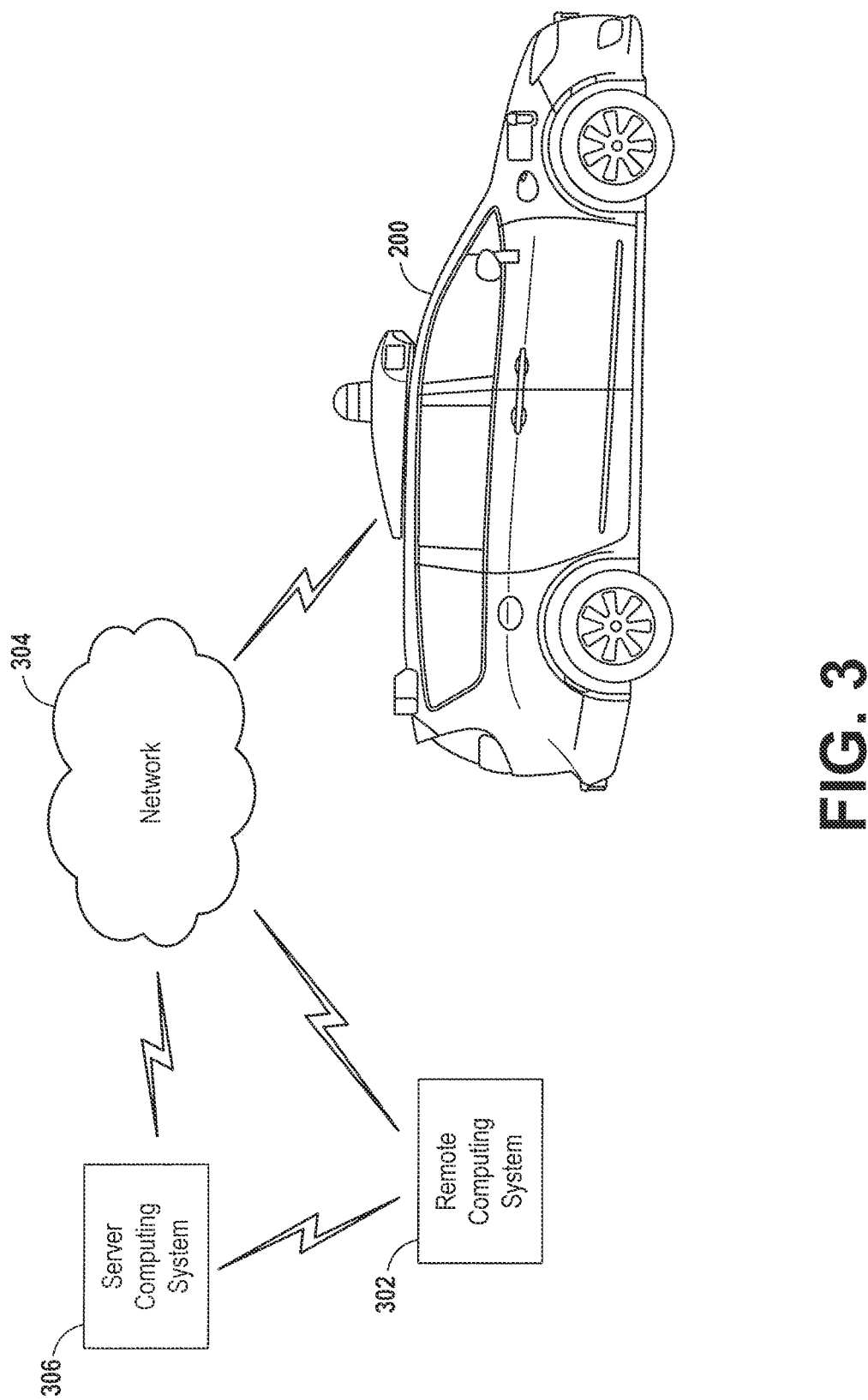
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and a vehicle 200 and a network 304. Wireless communication may also occur between a server computing system 306 and a remote computing system 302, and between the server computing system 306 and the vehicle 200.

The vehicle 200 can correspond to various types of vehicles capable of transporting passengers or objects between locations, and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to the vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some embodiments, remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has a wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some embodiments, operations described herein that are performed by the remote computing system 302 may be additionally or alternatively performed by the vehicle 200 (i.e., by any system(s) or subsystem(s) of vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some embodiments of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. These operations and related features will now be described.

In line with the discussion above, a computing system (e.g., remote computing system 302, the server computing system 306, or a computing system local to the vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and include image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
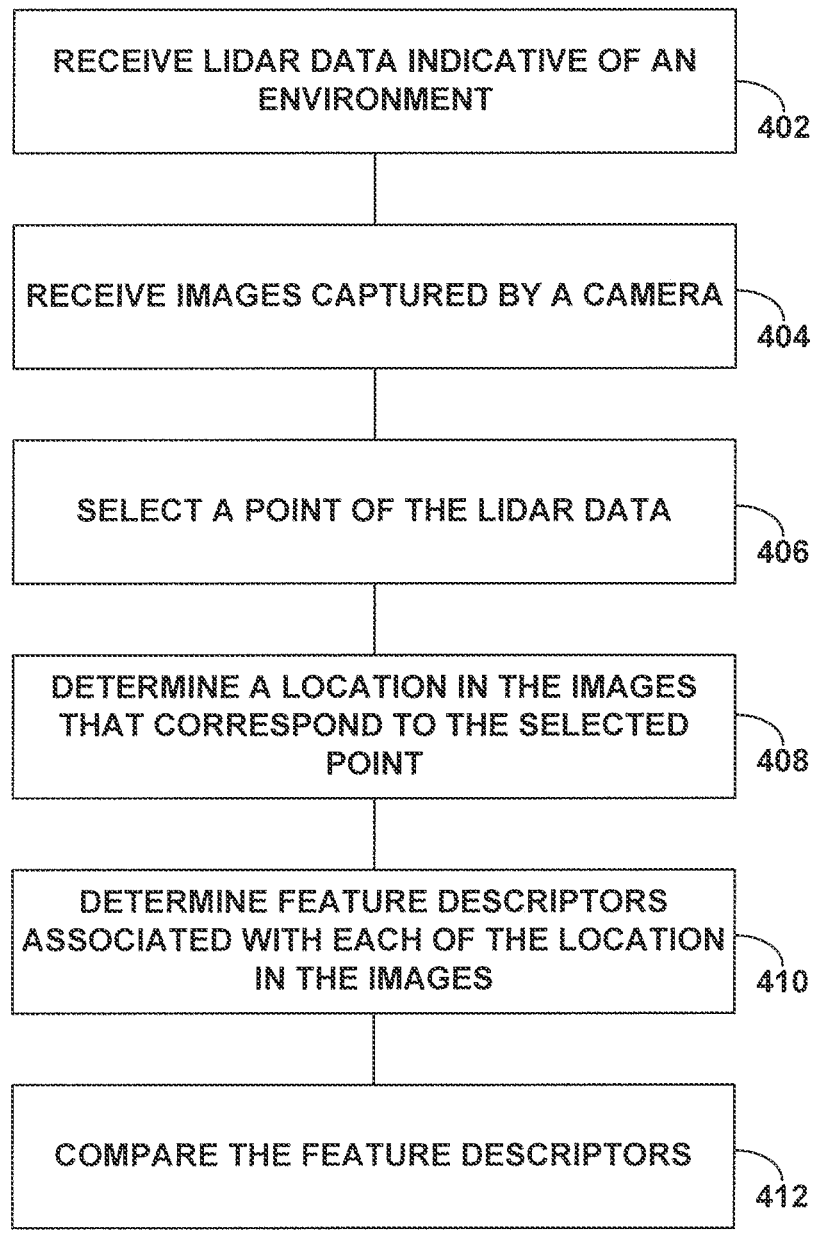
FIG. 4 is a block diagram of a method, according to an example embodiment.

FIG. 4 is a block diagram of an example method 400 for verifying the accuracy of sensor data, in accordance with at least some embodiments described herein. The method 400 shown in FIG. 4 presents an embodiment of a method that, for example, could be used with the vehicles 100, 200 and 200 as illustrated and described in reference to FIGS. 1-3, or components of the vehicles. For example, the methods or processes described herein may be carried out by the computer system 112 or the control system 106. The method 400 may include one or more operations, functions, or actions as illustrated by one or more of blocks 402-412. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM).

The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process, for example. Further, the method 400 may be performed while the vehicle is in motion.

At block 402, the method 400 may include receiving lidar data indicative of an environment or a scene. The lidar data may include a plurality of data points indicative of locations of reflections from the environment. For example, a computing device of a vehicle may be configured to receive information about the environment from a lidar unit, such as the first or second lidar unit shown in FIGS. 2A-E. In one embodiment, the lidar unit may capture and provide information about the environment to a computing device or system of the vehicle in the form of lidar data points, which may arrive at the computing device in the form of a point cloud. In some embodiments, the lidar data may be received from the full 360-degree field-of-view of the vehicle.

During operation, the lidar unit may measure distances between a vehicle and other objects in the environment by illuminating targets with lasers and analyzing the reflected light. The lidar unit may use ultraviolet, visible, or near infrared light to detect objects in the surrounding environment. Upon receiving information from the lidar unit, a computing device may be capable of determining distances between the vehicle and various objects within the environment, such as other vehicles, signs, trees, lane markers, or other objects. The computing device may also be capable of determining a size, speed, or location of the object based on the information provided by a lidar unit, for example.

In one embodiment, the computing device may receive a three-dimensional (3D) representation of the environment based on data from a lidar unit. For example, the 3D representation may be received by the computing device as a 3D point cloud based on data from a lidar unit. Each point of the 3D point cloud, for example, may be associated with a reflected light pulse. As such, the computing device may (e.g., continuously or from time-to-time) receive and/or generate 3D representations of points indicative of the locations of reflective features in the environment or portions thereof. In one embodiment, the point cloud may be associated with a set of vertices in a 3D coordinate system defined by x, y, and z coordinates.

The computing device may receive the data points indicative of the environment in a structured three dimensional (3D) point cloud and/or unstructured 3D point cloud. For example, the computing device may receive lidar data in a structured point cloud with each data point or sets of data points arranged based on objects in the local environment. An unstructured point cloud may include data points randomly received without any particular arrangement of the data points. In some instances, the computing device may receive data points within a grid-like point cloud. The lidar data may also include other information about the vehicle's environment. For example, the lidar data may include a respective intensity for each respective point of the lidar data. The intensity may be based on a reflectivity of the surface that reflects the laser light.

At block 404, the computing device may be configured to receive images captured by a camera of the environment or scene at different positions and times. The data of the images may overlap with each other and may also overlap with the data of a 3D point cloud. As previously discussed in FIGS. 1-3, an autonomous vehicle may include a camera system, which may contain a camera or multiple cameras. The camera system may be configured to capture images of the environment surrounding the autonomous vehicle. The cameras within the camera system may be configured to capture images in real-time and deliver the images to other systems of the autonomous vehicle. For example, an autonomous vehicle may be equipped with a camera similar to camera 130 of the vehicle 100 shown in FIG. 1.

The autonomous vehicle may include different types of cameras within the camera system. For example, the camera system may include digital cameras, still cameras, omnidirectional cameras, or other types. The cameras may be configured to capture images that include various amounts of pixels. Further, the camera system may capture images and/or videos and transmit the images and/or videos to a computing device or system associated with the autonomous vehicle. A computing device or system associated with the autonomous vehicle may receive the images from the camera system through a wired link or wirelessly.

During operation, the camera system of an autonomous vehicle may capture images of various objects within the environment as the autonomous vehicle navigates a path of travel. The camera system may capture images in real-time and may capture multiple images simultaneously using the same or different cameras. For example, an autonomous vehicle may be driving on a road while the camera system captures images of buildings, bridges, signs, or other objects. The images captured by the camera system may show objects at different angles due to the movement of the vehicle. For example, the camera system may capture multiple images of a building with each image showing the building with slight variations due to the vehicle changing position relative to the building. In addition, the cameras of the camera system may be configured to alter position or orientation during navigation to capture images of objects. The cameras may also be positioned in a manner to capture images of the environment periodically, regardless of any objects within the environment.

The camera system may provide different sets of images to a computing device or system of a vehicle of the environment. In one embodiment, the computing device of the autonomous vehicle may be capable of utilizing different sets of images to verify the accuracy of different cameras within the camera system. For example, an autonomous vehicle may capture two sets of images and use one set to verify the accuracy of the cameras on the left side of the vehicle and the other set of images to verify the accuracy of the cameras of the right side of the vehicle. An autonomous vehicle may also be configured to receive images from a single camera in order to focus upon verifying or calibrating the single camera.

A computing device associated with an autonomous vehicle may also be configured to determine the orientation and/or position of each camera (i.e., camera pose). For example, the computing system may determine a camera pose based on a vehicle-based coordinate system (e.g., relative position or orientation of the camera relative to the vehicle) or a global coordinate system, such as the specific location of the autonomous vehicle in the environment.

The computing device may determine parameters associated with each camera. For example, the computing device may track the camera system and determine when cameras may require extrinsic or intrinsic adjustment.

Figure 5:
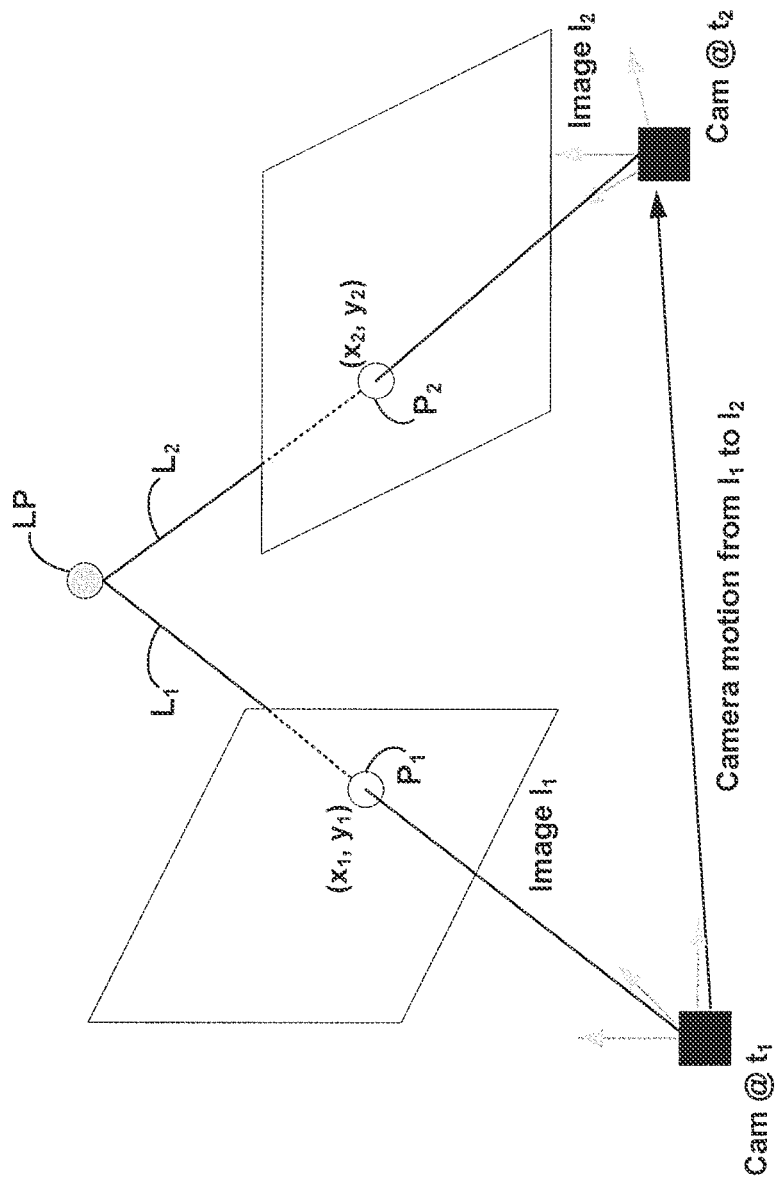
FIG. 5 is a conceptual illustration of an example for validating sensor data.

As shown in FIG. 5, the computing device may be configured to receive a 2D image $I_1$ of a portion of the environment or scene captured by a camera at time ($t_1$) while the vehicle is traveling in the environment. The camera may capture the 2D image $I_1$ from a camera pose at time ($t_1$). The computing device may also be configured to receive a 2D image $I_2$ of a second portion of the environment captured by the camera at time ($t_2$). The 2D image $I_2$ is captured by the camera at a camera pose at time ($t_2$) that is different than the camera pose at time ($t_1$) due to the motion of the camera as the vehicle travels through the environment. In one embodiment, the image data of the first and second images $I_1$ and $I_2$ may overlap with each other and may also overlap with the data of a point cloud.

The computing device may be configured to receive information indicative of a position of the camera. For example, the computing device may receive information from an inertial measurement unit (IMU) and/or a global positioning system (GPS) (e.g., Inertial Measurement Unit 124 and/or Global Positioning System 122 shown in FIG. 1) about the motion and position of the camera. Based on the received information, the computing device may be configured to determine a pose (e.g., a position and an orientation) of the camera. For example, the computing device may be configured to determine the poses of the camera. As shown in FIG. 5, the motion M of the camera can be determined between time $t_1$ and time $t_2$ based on the information from the inertial measurement unit (IMU) and/or a global positioning system (GPS).

At block 406, the computing device may select or identify, after receiving the images $I_1$ and $I_2$ from a camera, a point of the 3D point cloud that has a corresponding point or pixel in each of the camera images $I_1$ and $I_2$, as shown in FIG. 5. In one embodiment, the computing device may identify a data point associated with a static object in the LIDAR data, such as a tree, a street sign, etc. The computing device can identify the data point in the 3D point cloud using the techniques described above.

At block 408, the computing device may be configured to determine a location or point (e.g., a pixel) in each of the images $I_1$ and $I_2$ that corresponds to the selected data point of the 3D point cloud. In one embodiment, the computing device may project the data point of the 3D point cloud point into the 2D camera image space to identify a corresponding pixel or location in the images $I_1$ and $I_2$, as shown in FIG. 5. For example, the computing device may be configured to determine a location (e.g., pixel) in the image $I_1$ that corresponds to the selected data point of the 3D point cloud. Similarly, the computing device may be configured to determine a location or point (e.g., a pixel) in the image $I_2$ that corresponds to the selected data point of the 3D point cloud.

As shown in FIG. 5, a lidar point LP of the 3D lidar data is projected onto the camera image $I_1$ at image point $P_1$ with coordinates $(x_1, y_1)$ through line $L_t$ and the lidar point LP of the 3D lidar data is projected onto the camera image $I_2$ at image point $P_2$ with coordinates $(x_2, y_2)$ through line $L_2$. Accordingly, the computing device may determine a location in each of the images given the projections of a point of the 3D point cloud onto a corresponding point of the images. In another embodiment, the computing device may transform the selected data point of the 3D point cloud from lidar coordinates to camera coordinates in order to determine the corresponding pixel or location in the images $I_1$ and $I_2$. Accordingly, the locations in the images $I_1$ and $I_2$ corresponding to the 3D data point may be determined without comparing or feature matching image $I_1$ to image $I_2$.

At block 410, the computing device may be configured to determine keypoint and/or feature descriptors associated with the location $P_1$ of image $I_1$ and the location $P_2$ of image $I_2$ as shown in FIG. 5. For example, the computing device may be configured to extract keypoint and/or feature descriptors from the location identified $P_1$ in the first image $I_1$ and extract keypoint and/or feature descriptors from the location $P_2$ identified in the second image $I_2$. In one embodiment, binary descriptors are extracted from the identified locations $P_1$ and $P_2$ of each of the images $I_1$ and $I_2$. For example the keypoint and feature descriptors may be extracted using feature extraction algorithms such as BRIEF (Binary Robust Independent Elementary Features (BRIEF), Oriented FAST Rotated BRIEF (ORB), (Fast Retina Keypoint) (FREAK), Learned Invariant Feature Transform (LIFT).

In one embodiment, the computing device may be configured to determine a binary descriptor of the location $P_1$ identified in the image $I_1$ and to determine a binary descriptor of the location $P_2$ identified in the image $I_2$. The binary descriptors may be associated with a value of at least one pixel in the respective images. For example, the binary descriptor of the location $P_1$ may be determined based on the value of the pixel at the location $P_1$ and the values of one or more neighboring pixels in the image $I_1$, and the binary descriptor of the location $P_2$ may be determined based on the value of the pixel at the location $P_2$ and the values of one or more neighboring pixels in the image $I_2$. In one embodiment, a descriptor might be an n-dimensional binary vector Alternatively, the descriptor may be an n-dimensional real-numbered vector, which is constructed by concatenating histograms of functions of local image intensities, such as gradients.

At block 412, the method includes performing a comparison of the feature descriptors extracted from the images $I_1$ and $I_2$. For example, a correspondence between keypoint or feature descriptors in the image $I_1$ and keypoint or feature descriptors in the image $I_2$ is determined through a comparison or matching algorithm. For example, the computing device compares descriptors for the location of image $I_1$ to the descriptors for the location of the image $I_2$ to determine whether the descriptors match. In one embodiment, the computing device may calculate the Euclidian distance between the descriptors of the images. In another embodiment, a Hamming distance is determined between the descriptors. The distance or difference between the descriptor for the image $I_1$ and the descriptor for the image $I_2$ is compared to a threshold to determine whether a sensor calibration or a sensor error exists. For example, when the Hamming distance exceeds a threshold, the camera may be miscalibrated or may be experiencing a sensor issue. If the Hamming distance across several cameras suddenly increases, the 3D point cloud may be geometrically inaccurate or the camera pose may be inaccurate. For example, if the lidar device does not provide a correct steering angle, the comparison of the feature descriptors may produce large values across all image pairs. If the sensor data is inaccurate, a computing device can send a signal to a control system to instruct a vehicle to pull over, stop, or any other navigation action. In addition, the vehicle may exit from an autonomous operation mode.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computing device comprising:
   a memory; and
   at least one processor coupled to the memory, the at least one processor configured to:
   receive lidar data generated by a lidar device coupled to a vehicle, wherein the lidar data includes a plurality of lidar data points indicative of locations of reflections from an environment of the vehicle;
   receive a first image of a first portion of the environment captured by a camera at a first time, wherein the camera is coupled to the vehicle, and wherein the camera has a first pose at the first time according to pose data from a pose sensor coupled to the vehicle;
   receive a second image of a second portion of the environment captured by the camera at a second time, wherein the camera has a second pose at the second time according to the pose data from the pose sensor;
   determine a first location in the first image that corresponds to a lidar data point of the plurality of lidar data points;
   determine a second location in the second image that corresponds to the lidar data point of the plurality of lidar data points;

perform a comparison of image contents at the first location in the first image and image contents at the second location in the second image; and determine that sensor data associated with at least one of the lidar device, the camera, or the pose sensor is accurate or inaccurate based on the comparison.

2. The computing device of claim 1, wherein performing the comparison comprises:

determining a first feature descriptor that characterizes, within a feature descriptor space, the image contents at the first location in the first image;

determining a second feature descriptor that characterizes, within the feature descriptor space, the image contents at the second location in the second image; and determining a distance between the first feature descriptor and the second feature descriptor within the feature descriptor space.

3. The computing device of claim 2, wherein the distance comprises a Hamming distance.

4. The computing device of claim 2, wherein the first and second feature descriptors are n-bit binary strings, and wherein the feature descriptor space is an n-dimensional space.

5. The computing device of claim 1, wherein the at least one processor is further configured to:

receive the pose data from the pose sensor; and
determine the first pose and the second pose based on the pose data.

6. The computing device of claim 1, wherein the at least one processor is further configured to select the first image and the second image for the comparison based on at least (i) a time difference between the first time and the second time and (ii) a speed of the vehicle.

7. The computing device of claim 2, wherein the first location corresponds to a first pixel in the first image, and wherein the second location corresponds to a second pixel in the second image.

8. The computing device of claim 7, wherein the first feature descriptor is determined based on the first pixel and one or more neighboring pixels in the first image, and wherein the second feature descriptor is determined based on the second pixel and one or more neighboring pixels in the second image.

9. The computing device of claim 1, wherein determining the first location comprises projecting the lidar data point into the first image, wherein determining the second location comprises projecting the lidar data point into the second image, and wherein the first portion of the environment overlaps with the second portion of the environment.

10. The computing device of claim 1, wherein the lidar data point is associated with a static object in the environment.

11. The computing device of claim 1, wherein the at least one processor is further configured to send a signal to cause the vehicle to stop, slow down, or pull over in response to determining that the sensor data is inaccurate.

12. The computing device of claim 1, wherein the plurality of lidar data points comprises a three-dimensional point cloud.

13. A method comprising:

receiving, by a computing device, lidar data obtained by a lidar device coupled to a vehicle, wherein the lidar data includes a plurality of lidar data points indicative of locations of reflections from an environment of the vehicle;

receiving, by the computing device, a first image of a first portion of the environment captured by a camera at a first time, wherein the camera is coupled to the vehicle, and wherein the camera has a first pose at the first time according to pose data from a pose sensor coupled to the vehicle;

receiving, by the computing device, a second image of a second portion of the environment captured by the camera at a second time, wherein the camera has a second pose at the second time according to the pose data from the pose sensor;

determining, by the computing device, a first location in the first image that corresponds to a lidar data point of the plurality of lidar data points;

determining, by the computing device, a second location in the second image that corresponds to the lidar data point of the plurality of lidar data points;

performing, by the computing device, a comparison of image contents at the first location in the first image and image contents at the second location in the second image; and determining, by the computing device, that sensor data associated with at least one of the lidar device, the camera, or the pose sensor is accurate or inaccurate based on the comparison.

14. The method of claim 13, wherein performing the comparison comprises:

determining a first feature descriptor that characterizes, within a feature descriptor space, the image contents at the first location in the first image;

determining a second feature descriptor that characterizes, within the feature descriptor space, the image contents at the second location in the second image; and determining a distance between the first feature descriptor and the second feature descriptor within the feature descriptor space.

15. The method of claim 14, wherein the distance comprises a Hamming distance.

16. The method of claim 14, wherein the first and second feature descriptors are n-bit binary strings, and wherein the feature descriptor space is an n-dimensional space.

17. A non-transitory computer-readable medium storing instructions, the instructions being executable by one or more processors to perform functions comprising:

receiving a first image of a first portion of an environment captured by a camera at a first time, wherein the camera is coupled to a vehicle, and wherein the camera has a first pose at the first time according to pose data from a pose sensor coupled to the vehicle;

receiving a second image of a second portion of the environment captured by the camera at a second time, wherein the camera has a second pose at the second time according to the pose data from the pose sensor;

determining a first location in the first image that corresponds to a lidar data point of a plurality of data points;

determining a second location in the second image that corresponds to the lidar data point of the plurality of lidar data points;

performing a comparison of image contents at the first location in the first image and image contents at the second location in the second image; and determining that sensor data associated with at least one of a lidar device, the camera, or the pose sensor is accurate or inaccurate based on the comparison.

18. The non-transitory computer-readable medium of claim 17, wherein performing the comparison comprises:

determining a first feature descriptor that characterizes, within a feature descriptor space, the image contents at the first location in the first image;

determining a second feature descriptor that characterizes, within the feature descriptor space, the image contents at the second location in the second image; and determining a distance between the first feature descriptor and the second feature descriptor within the feature descriptor space.

19. The non-transitory computer-readable medium of claim 18, wherein the distance comprises a Hamming distance, and wherein the first and second feature descriptors are n-bit binary strings, and wherein the feature descriptor space is an n-dimensional space.

20. The non-transitory computer-readable medium of claim 17, further comprising instructions for selecting the first image and the second image for the comparison, wherein the selecting is based on at least (i) a time difference between the first time and the second time and (ii) a speed of the vehicle.

* * * * *